United States Patent

[11] 3,603,513

| [72] | Inventor | Gwynfor Maple Harries<br>Efail, Blaenannerch, Cardiganshire, England |
|---|---|---|
| [21] | Appl. No. | 21,874 |
| [22] | Filed | Mar. 23, 1970 |
| [45] | Patented | Sept. 7, 1971 |

[54] MANURE SPREADER
15 Claims, 3 Drawing Figs.

[52] U.S. Cl. .................................................. 239/657,
239/664, 239/669
[51] Int. Cl. ...................................................... A01c 3/06
[50] Field of Search ............................................ 239/651,
657, 664, 669, 668, 679

[56] References Cited
UNITED STATES PATENTS

| 2,774,602 | 12/1956 | Sanderson .................... | 239/664 X |
| 3,010,727 | 11/1961 | Swenson et al. .............. | 239/657 |

Primary Examiner—Lloyd L. King
Attorney—Hall, Pollock & Vande Sande

ABSTRACT: An agricultural trailer for spreading manure, having a wheeled chassis, a tilting hopper mounted on the chassis and controlled by hydraulic jacks to tilt towards one side and a rotary power operated flail impeller mounted on a fixed axis adjacent the discharge side of the hopper to throw out the manure as the hopper is tilted. Within the hopper is a movable wall connected to the chassis to move automatically towards the flail impeller as the hopper tilts.

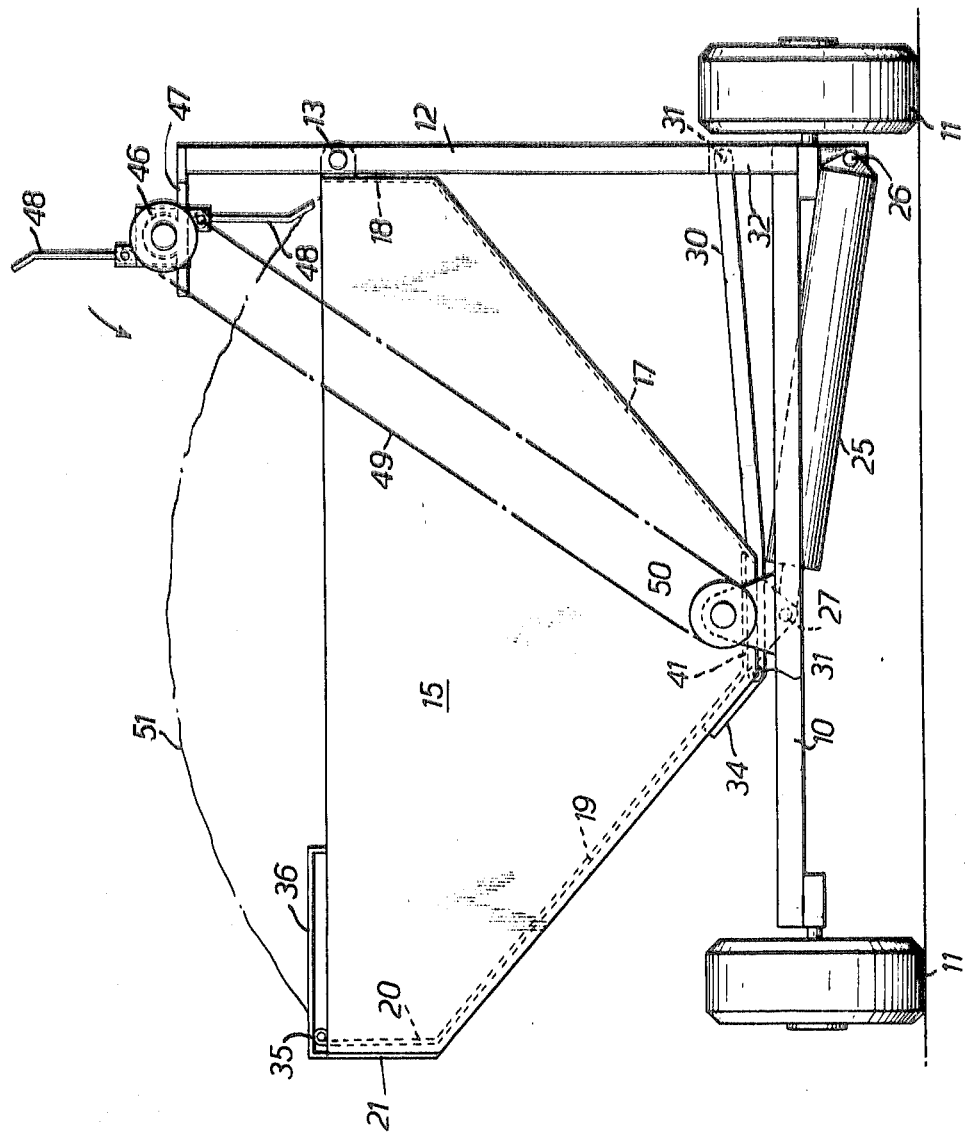

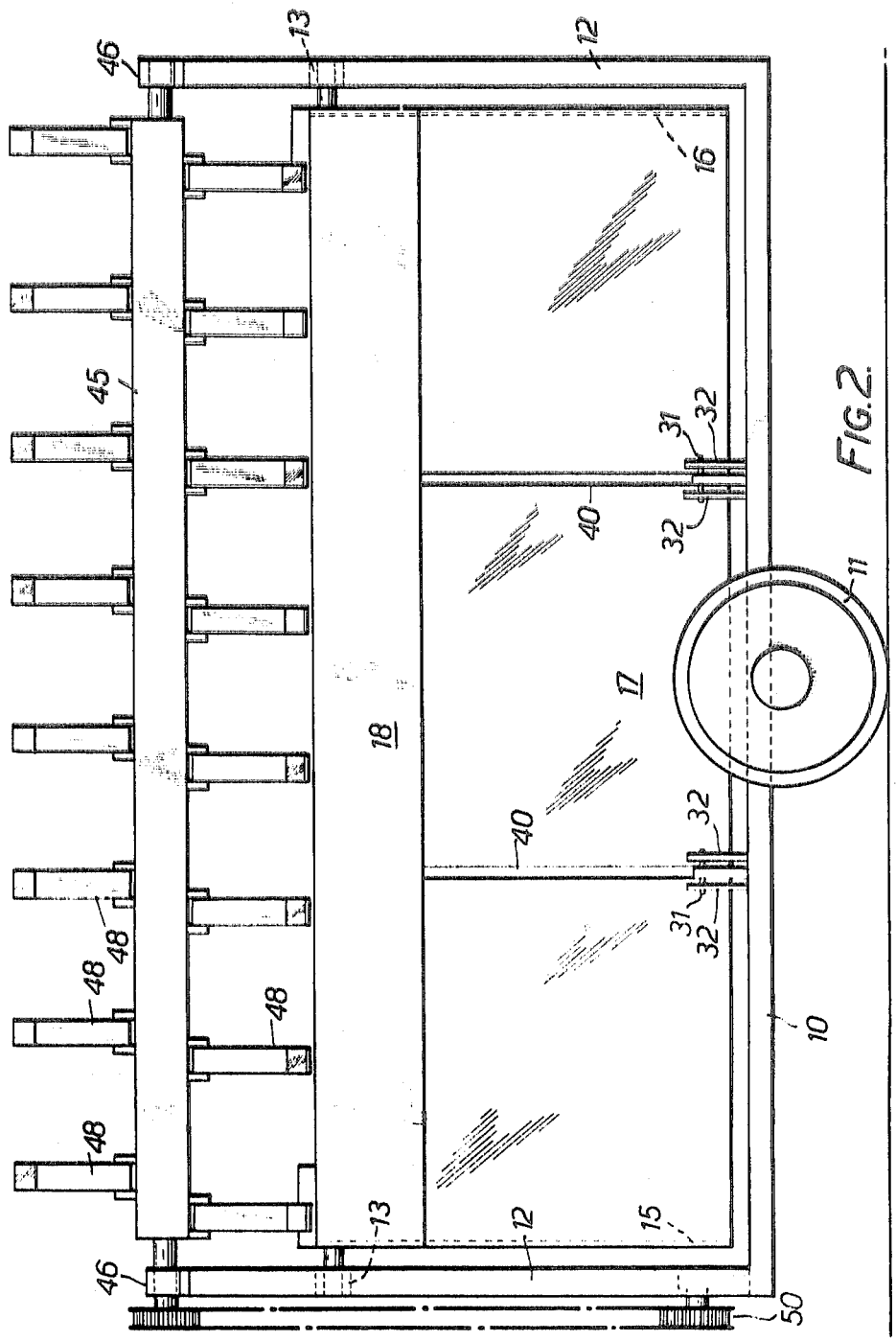

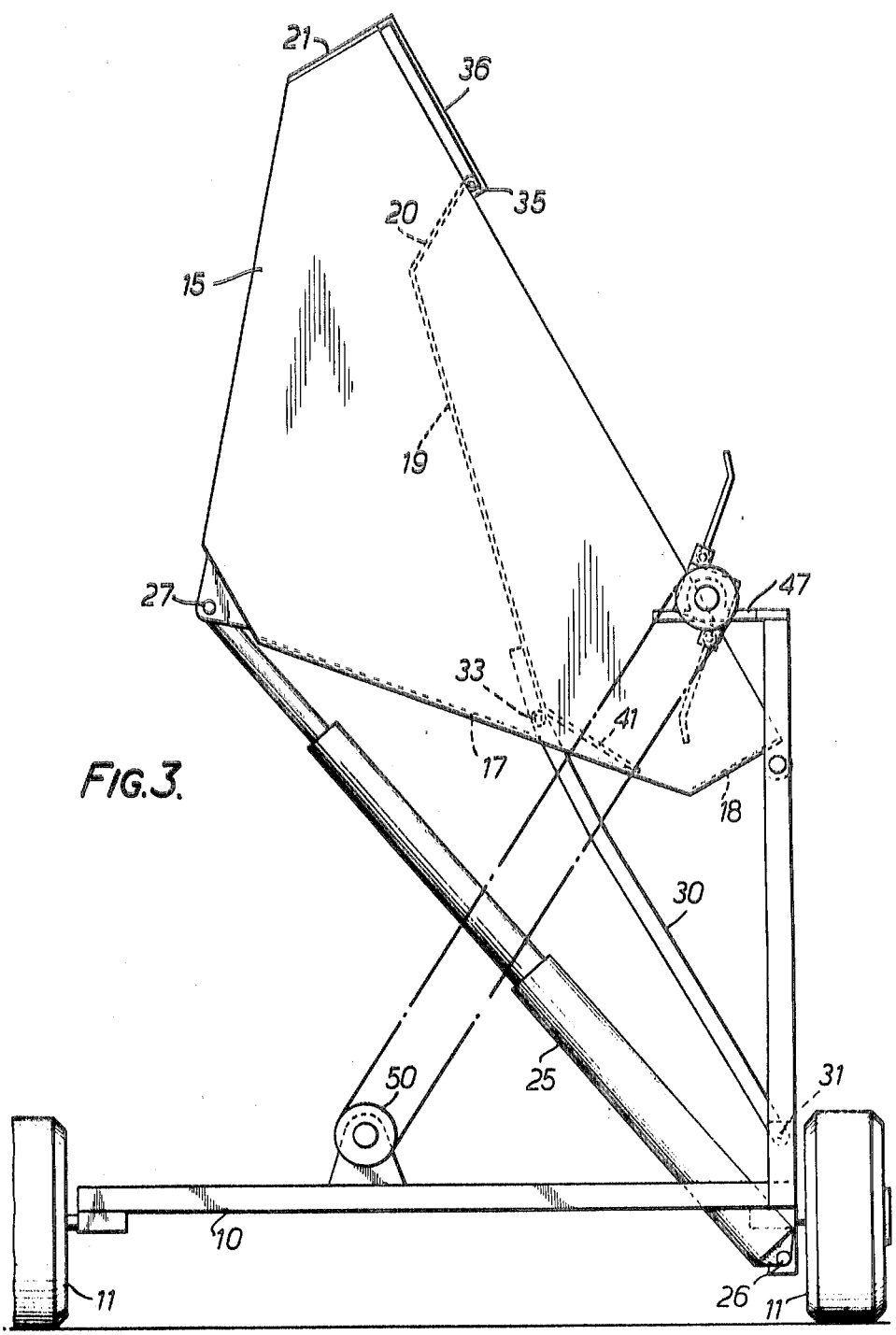

MANURE SPREADER

This invention relates to apparatus for spreading solid or semisolid substances, for example manure or sewage slurry.

For agricultural and other purposes it is often required that the material should be discharged and spread over a comparatively wide area and existing spreading machines suffer from a number of problems and disadvantages, including excessive power absorption. Some of these problems arise from the nature of the material to be spread, which in the case of manure may be extremely heavy and difficult to move.

The invention consists broadly in apparatus for spreading manure and other solid or semisolid material comprising a receptacle mounted on a chassis or frame, means for tilting the receptacle from its normal upright position, so as to assist in discharging the contents from one side thereof, a rotary impeller positioned adjacent the discharge side of the receptacle and arranged to impel the contents out of the receptacle, and a movable wall element arranged to assist in moving the contents towards the discharge side thereof.

Preferably the receptacle is mounted to tilt about a substantially horizontal pivotal axis, which may be fixed or movable, adjacent an upper edge thereof, and the impeller axis is preferably positioned above this edge, and above the pivotal axis, the impeller conveniently being supported in bearings carried by a part fixed to the chassis or frame. The blades, flails or other operative members of the impeller may be positioned entirely above the edges of the receptacle when in its normal upright position, so that the impeller only begins to operate on the contents when the receptacle is tilted. In some cases, however the impeller may be so arranged and positioned that it acts on the contents of the receptacle while still upright.

According to a preferred feature of the invention the impeller axis is displaced horizontally inwards from the discharge side of the receptacle, in its tilted position, and conveniently the impeller comprises a shaft carrying a number of spaced blades, paddles, or flails.

In any case it is preferred that the position and dimensions of the impeller in relation to the receptacle are such that the impeller acts only on part of the contents of the receptacle adjacent the discharge side thereof.

According to another preferred feature of the invention the movable wall element is arranged to be moved automatically towards the discharge side as the receptacle is tilted. In the normal upright position the wall element preferably lies on the opposite side of the receptacle, and may extend across part of the bottom walls.

The invention is particularly applicable to an agricultural spreading machine in which the chassis or frame has ground wheels, and includes means for attachment to an agricultural tractor. The receptacle may be arranged to tilt towards the rear end of the machine, but preferably the tilting axis and the axis of the impeller are arranged in a front-to-rear direction. The apparatus may include hydraulically operated motor means for tilting the receptacle, and power driven mechanism for rotating the impeller. For example there may be a hydraulic ram for tilting the receptacle, hydraulic pressure connections between the ram and the usual hydraulic supply equipment on the tractor, and a mechanical drive between the impeller and the usual power takeoff shaft on the tractor.

The invention may be performed in various ways and one specific embodiment will now be described by way of example with reference to the accompanying drawings, in which:

FIG. 1 is a diagrammatic end view of an agricultural manure spreader according to the invention, in its normal towing position, FIG. 2 is a side elevation thereof; and FIG. 3 is an end view, similar to FIG. 1, showing the apparatus in a tilted position.

In this example the invention is applied to a trailer-type agricultural manure spreader which includes a chassis 10 mounted on ground wheels 11 and having a drawbar at one end (not shown) for connection to the usual hitch on an agricultural tractor. At one side of the chassis two upstanding posts 12 are provided with bearings 13 which provide a fixed horizontal fore and aft pivot axis for the main manure receptacle. This receptacle comprises two end walls 15, 16 a front wall including a downwardly inclined lower part 17 and a vertical upper part 18, and a back wall which is movable and includes a downwardly inclined lower part 19 and an upper part 20. The two end walls 15, 16 are rigidly interconnected at the back of the receptacle by a welded plate 21, the front wall portions 17, 18 similarly being welded to the end walls 15, 16. The unit consisting of the end walls 15, 16 the front wall portions 17, 18 and the backplate 21, is capable of tilting bodily about the pivotal axis provided by the bearings 13. This tilting movement is effected by a pair of hydraulic jacks 25, each of which is pivotally attached at 26 to an anchorage rigid with the chassis, and pivotally connected at its other end 27 to a lug attached to the underside of the receptacle. In the normal towing position of FIG. 1, with the receptacle upright, the receptacle may rest on fixed stops (not shown) provided on the chassis. The fully tilted position of the receptacle is illustrated in FIG. 3.

The movable back wall unit consisting of the wall members 19 and 20 is connected to a pair of pivoted links 30, each of which is pivotally connected at one end to a pivot 31 provided by a pair of lugs 32 mounted on a member of the chassis. The other end of each link 30 is pivotally connected at 33 to a reinforcing flange 34 welded to the movable wall member 19. The upper end of the movable wall member 20 is provided with a pair of projecting pins 35 which can slide longitudinally in guide slots provided by brackets 36 secured to the upper edges of the two end walls 15, 16. The lower inclined front wall element 17 is provided with two parallel spaced vertical slots 40, through which the connecting links 30 can slide as the receptacle is tilted into its elevated position shown in FIG. 3. The movable lower back wall element 19 is connected to a movable bottom wall element 41 which in the tilted position of the receptacle somewhat reduces the area of these slots 40 which is left open.

The rotary impeller comprises a shaft or tube 45 mounted in bearings 46 carried by brackets 47 secured to the upper ends of the posts 12. As clearly seen in FIG. 1 the rotary axis of the impeller is positioned above the pivot axis of the receptacle provided by the bearings 13, and is also spaced inwardly from the discharge side of the receptacle towards the center thereof. The rotary impeller axis however is positioned noncentrally with respect to the receptacle, and adjacent the discharge side. Attached to the impeller shaft 25 at spaced points along its length are a number of pivoted flails or blades 48, the radial dimensions of these flails being such that in the normal upright position of the receptacle the flails pass closely above the upper edges of its side and end walls. The impeller is driven by a chain 49 running over a sprocket at one end of the impeller shaft and another sprocket 50 mounted on the chassis, this sprocket 50 being connected to a shaft coupling (not shown) including universal joints, for attachment to the normal power takeoff shaft of the towing tractor.

The hydraulic ram 25 is connected via flexible pressure conduits (not shown) to the normal hydraulic power supply on the towing tractor, which includes manually operated control valves for admitting hydraulic fluid at a controlled slow rate to the ram so as to progressively tilt the receptacle, at a selected rate, from the upright position of FIG. 1 to the tilted position of FIG. 3.

In operation the receptacle will normally be loaded to the level indicated at 51 in FIG. 1. At the start of the spreading operation the driver will engage the power drive to the sprocket 50 thus causing the impeller to rotate in the direction of the arrows so that the lower flails will pass over the manure adjacent the discharge side of the receptacle and throw manure laterally from the trailer. The tractor is then driven slowly across the field and the driver opens the control valve causing hydraulic fluid to be admitted slowly to the ram 25. As the receptacle tilts the impeller blades progressively "eat" into the manure within the receptacle throwing this manure forcibly out to a considerable distance. It will be noted that only the tips of the impeller blades engage the manure and it is found that this greatly reduces the power necessary to drive the impeller. As the receptacle tilts further towards the position illustrated in FIG. 3 the movable back wall section automatically moves towards the discharge side of the receptacle thus urging the remaining manure towards the impeller so that eventually the whole, or the greater part of the manure is fully discharged by the impeller motion.

I claim:

1. Apparatus for spreading manure or other solid or semisolid loose material, comprising a receptacle mounted on a chassis or frame, means for tilting said receptacle from its normal upright position, so as to assist in discharging the contents from one side thereof, a rotary impeller positioned adjacent the discharge side of said receptacle and arranged to impel the contents out of said receptacle, and a movable wall element arranged to assist in moving the contents towards the discharge side of said receptacle.

2. Apparatus according to claim 1, in which said receptacle is mounted to tilt about a substantially horizontal pivotal axis adjacent an upper edge thereof, and the impeller axis is positioned above the said pivotal axis.

3. Apparatus according to claim 1 in which the impeller axis is displaced horizontally inwards from the discharge side of the said receptacle, in its tilted position.

4. Apparatus according to claim 1 in which said impeller comprises a shaft carrying a number of spaced blades, paddles or flails.

5. Apparatus according to claim 1, in which the position and dimensions of said impeller in relation to said receptacle are such that the impeller acts on part of the contents of the receptacle adjacent the discharge side thereof.

6. Apparatus according to claim 1 in which said impeller is mounted in fixed bearings supported by said chassis or frame.

7. Apparatus according to claim 1, in which said movable wall element is arranged to be moved automatically towards the discharge side as the receptacle is tilted.

8. Apparatus according to claim 7, in which said movable wall element is connected to a fixed part of the chassis or frame, and thus moves relative to the receptacle when said receptacle is tilted.

9. Apparatus according to claim 1, in which said chassis or frame has ground wheels, and includes means for attachment to an agricultural tractor.

10. Apparatus as claimed in claim 1, including hydraulically operated means for tilting said receptacle.

11. Apparatus according to claim 1, including power driven mechanism for rotating said impeller.

12. Apparatus for spreading loose material, such as manure, comprising a trailer chassis supported on ground wheels, an open topped receptacle mounted on said chassis for lateral tilting movement towards one side of said chassis, power operated means for tilting said receptacle, and a rotary impeller mounted on said chassis for rotation about an axis parallel to the front-to-rear axis of the trailer chassis and positioned adjacent to one upper lateral edge of said receptacle, parts of said impeller being arranged to extend inwardly above said lateral edge of the receptacle whereby said impeller progressively engages deeper within said receptacle as said receptacle is tilted.

13. Apparatus according to claim 12, wherein said receptacle is of generally V-section in planes perpendicular to said impeller axis.

14. Apparatus according to claim 12, including a movable pusher element located within said receptacle, and means for moving said element towards said impeller when the receptacle is tilted.

15. Apparatus according to claim 14, wherein said pusher element comprises a wall member normally located within said receptacle adjacent the side thereof remote from said impeller.